(12) United States Patent
Okamoto

(10) Patent No.: US 6,384,493 B1
(45) Date of Patent: May 7, 2002

(54) DRIVE DEVICE AND APPARATUS EQUIPPED WITH SAID DRIVE DEVICE

(75) Inventor: Yasuhiro Okamoto, Tondabayashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/534,867

(22) Filed: Mar. 24, 2000

(30) Foreign Application Priority Data

Mar. 26, 1999 (JP) ............................................ 11-083740

(51) Int. Cl.[7] ............................................... H02K 41/00
(52) U.S. Cl. ......................... 310/12; 310/348; 310/354
(58) Field of Search ............................. 310/12, 13, 14, 310/311, 314, 317, 354, 355, 348; 335/253

(56) References Cited

U.S. PATENT DOCUMENTS 3,482,124 A  * 12/1969  Pelenc ......................... 310/12

FOREIGN PATENT DOCUMENTS

JP      10-225149 A     8/1998

* cited by examiner

*Primary Examiner*—Nestor Ramirez
*Assistant Examiner*—Judson H. Jones
(74) *Attorney, Agent, or Firm*—Sidley Austin Brown & Wood

(57) ABSTRACT

The distance between the side surfaces of a spacer 35 is made slightly smaller than the width of the drive friction member 46, and a pair of spring plates 32 are mounted to these side surfaces. The spring plates 32 enter the movement path of the drive friction member 46 and provide a constant level of friction between the spring plates 32 and the drive friction member 26.

12 Claims, 11 Drawing Sheets

Fig.3A
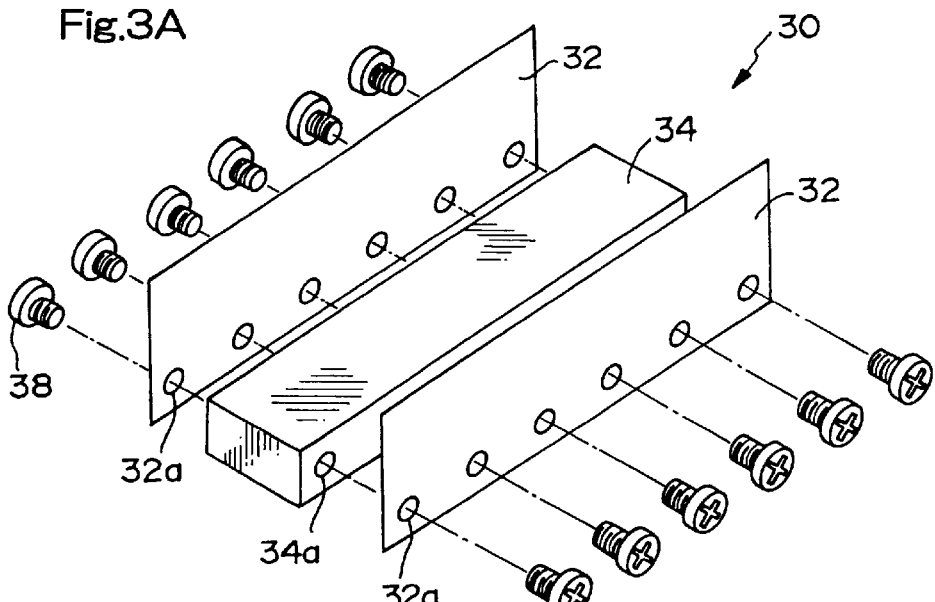
Fig.3B
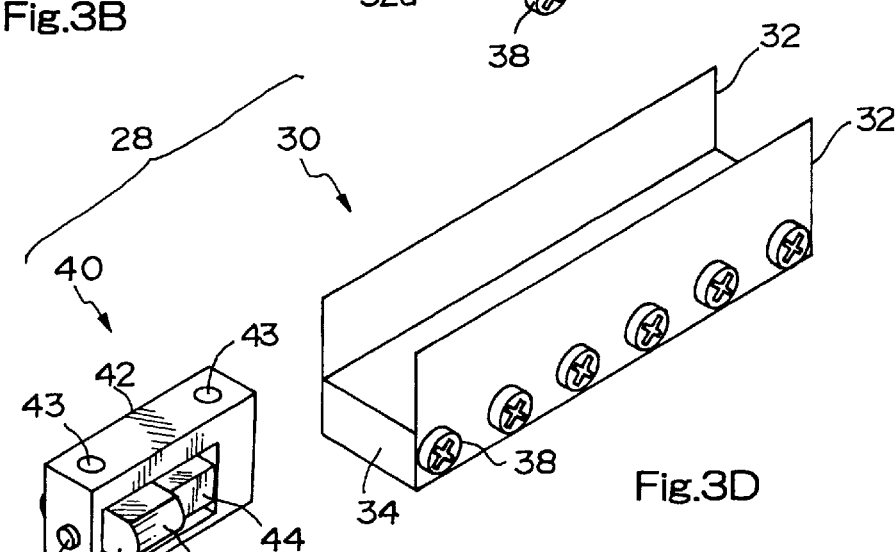
Fig.3D
Fig.3C
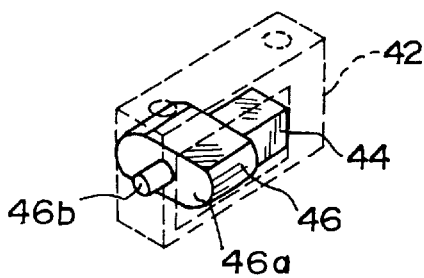
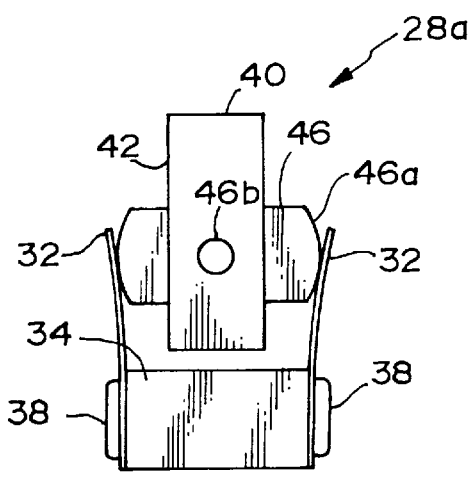

DRIVE DEVICE AND APPARATUS EQUIPPED WITH SAID DRIVE DEVICE

This application is based on application No. Hei 11-83740 filed in Japan, the content of which is hereby incorporated by reference.

BACKGROUND OF THE INVENTION

1. Field of the Invention

The present invention pertains to a drive device, and more particularly, to a drive device using an electromechanical conversion element such as a piezoelectric element. The present invention also pertains to an apparatus equipped with a drive device, such as an X-Y drive table, a camera lens or a scanning tunnel electron microscope.

2. Description of the Related Art

The applicant has previously proposed a drive device that achieves a high, sub-micron level resolution using a piezoelectric linear actuator instead of a stepping motor.

For example, the drive device 1 shown in the perspective view of FIG. 1A was disclosed in Japanese Laid-Open Patent Publication No. Hei 10-225149 (10225149), wherein a drive unit 20 is grasped in the space 9 between a pair of fixed friction members 4 and 6 fixed on the top surface 2s of a base 2 such that the drive unit 20 remains in place via friction. One fixed friction member 6 is supported on the base 2 via support springs 8 and is pushed toward the other fixed friction member 4.

To explain in more detail, the drive unit 20 comprises a moving unit 24 that is connected to an object to be driven such as a lens or stage, which is not shown in the drawing, and that has a relatively large mass; a piezoelectric element 22; and a drive friction member 26 that has a relatively small mass. One end of the length of the piezoelectric element 22, along which length expansion or contraction occurs, is fixed to the moving unit 24, while the other end is fixed to one end of the shaft of the drive friction member 26. The drive friction member 26 is supported by the moving unit 24 such that it can freely move in the same directions in which piezoelectric element 22 expands or contracts.

To explain in further detail, the piezoelectric element 22 is a kind of electromechanical conversion element. It comprises multiple piezoelectric plates that undergo changes in volume when a voltage is applied to them, and expands or contracts along its length as the applied voltage changes. The moving unit 24 has an essentially column-like configuration, and has on its top surface screw holes 24a and 24b to mount an object to be driven which is not shown in the drawing. Parts of the body 24c of the moving unit 24 are cut out from the top such that two concave areas 24s and 24t are formed, in which are placed the piezoelectric element 22 and the drive friction member 26, respectively. The drive friction member 26 comprises a cylindrical main unit 26s and shafts 26t sticking out from either end of the main unit. Each shaft 26t is supported by the moving unit 24, such that the drive friction member 26 may freely move in the directions in which they extend. One shaft 26t is fixed to the piezoelectric element 22. The width of the main unit 26s of the drive friction member 26 is larger than that of the piezoelectric element 22 or the moving unit 24. As shown in FIG. 1B, the outer circumference of the main unit 26s is in contact with the surfaces 4s and 6s of the fixed friction members 4 and 6 that face the drive unit 20.

A drive pulse generating circuit not shown in the drawing is connected to each electrode of the piezoelectric element 22, so that a pulse voltage having sawtooth-shaped waves or full-wave rectified waves may be applied to the piezoelectric element 22. For example, the drive friction member 26, and therefore the moving unit 24 and the object to be driven, are moved along the fixed friction members 4 and 6, by causing the piezoelectric element 22 to expand and contract at different speeds so that sliding will occur between the drive friction member 26 and the fixed friction members 4 and 6 in opposite directions and with different magnitudes, or so that sliding will occur only when the piezoelectric element 22 expands or contracts.

In this drive device 1, when the position of the drive unit 20 changes relative to that of the fixed friction members 4 and 6, the pressure that the drive friction member 26 receives from the fixed friction members 4 and 6 changes depending on the elastic deformation and the change in the tilting of the fixed friction member 6, resulting in a change in friction between the drive friction member 26 and the fixed friction members 4 and 6, and therefore in a change in the driving conditions. Consequently, the driving speed and drive force change depending on the position of the drive friction member 26, relative to that of the fixed friction members 4 and 6.

The applicant therefore proposed an improved drive device 10 in which the fixed friction members 14 comprise a number of spring elements 15 mounted on the surface 12s of the base 12, and in which an essentially constant level of friction is applied between the fixed friction members 14 and the drive friction member 26 based on a construction in which only the spring elements 15 that are in contact with the drive friction member 26 warp. For example, multiple individual contact pieces 15 are formed by means of a number of spring pieces or fixed friction members 14 in which notches 14s are formed, as shown in FIG. 2.

Further, the applicant also proposed an improvement in which metal sheets, for example, are placed on the surfaces that come into contact with the drive friction member of the spring elements comprising the fixed friction members, so that the drive friction member does not become stuck between the spaces of the spring elements and the drive friction member smoothly slides against the metal sheets.

However, if the fixed friction members comprise a number of spring elements, in order to maintain the speed and thrust of the moving unit at an accurate level, accuracy in the processing and assembling of the fixed friction members must be increased. In addition, in order to adjust the friction, it is necessary to change the amount of warp by changing the degree to which each spring element of the fixed friction members encroaches in the movement path of the drive friction member. Further, because the fixed friction members are formed with a number of spring elements, a large number of components is needed.

SUMMARY OF THE INVENTION

The object of the invention is to provide a drive device that can reduce the fluctuation in friction between the fixed friction member and the drive friction member so that it is constant, using a simple construction.

In order to attain the object stated above, one aspect of the present invention is a drive device comprising an electromechanical conversion element that is connected to a drive pulse generator and expands or contracts, a moving unit that is fixed to one end of the length of the electromechanical conversion element, along which length expansion or contraction occurs, a drive friction member that is connected to the other end of said length of the electromechanical conversion element, and two elongated fixed friction members that extend and are fixed along the movement path of the drive friction member and that grasp the drive friction member in between them by means of friction. When the drive friction member is driven by causing the electromechanical conversion element to expand and contract by means of the drive pulse generator, the moving unit moves in a prescribed direction. Further, the drive device has a spacer that has side surfaces that are distanced from each other over a distance slightly smaller than the width of the drive friction member and that extend along the movement path of the drive friction member. The two fixed friction members are mounted to respective opposite side surfaces of the spacer. At least one of them includes a plate member having a spring capability such that an essentially constant level of friction is provided between the fixed friction members and the drive friction member along the movement path of the moving unit.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
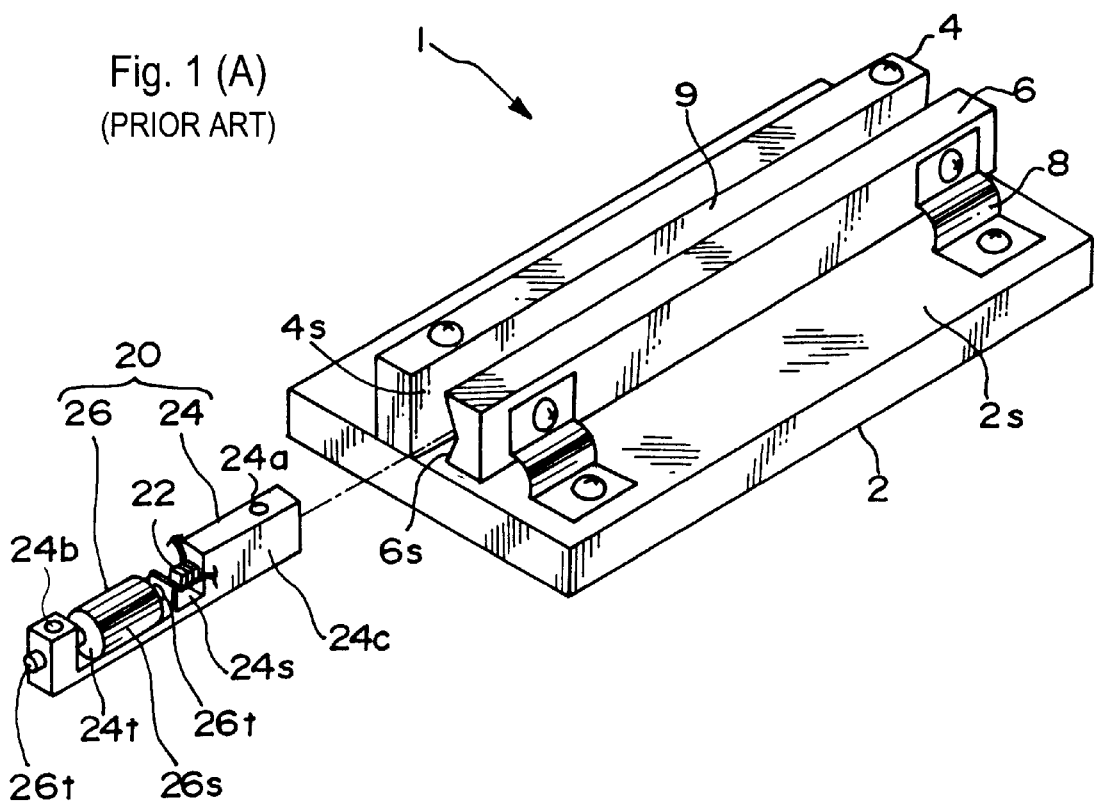
FIGS. 1A and 1B are a perspective view and a plan view of a conventional drive device.
Figure 1:
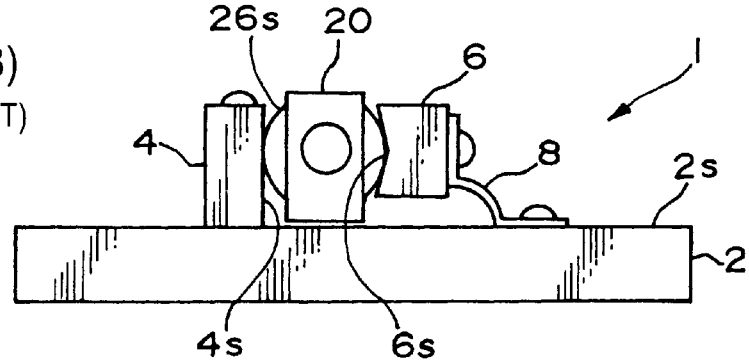
Figure 2:
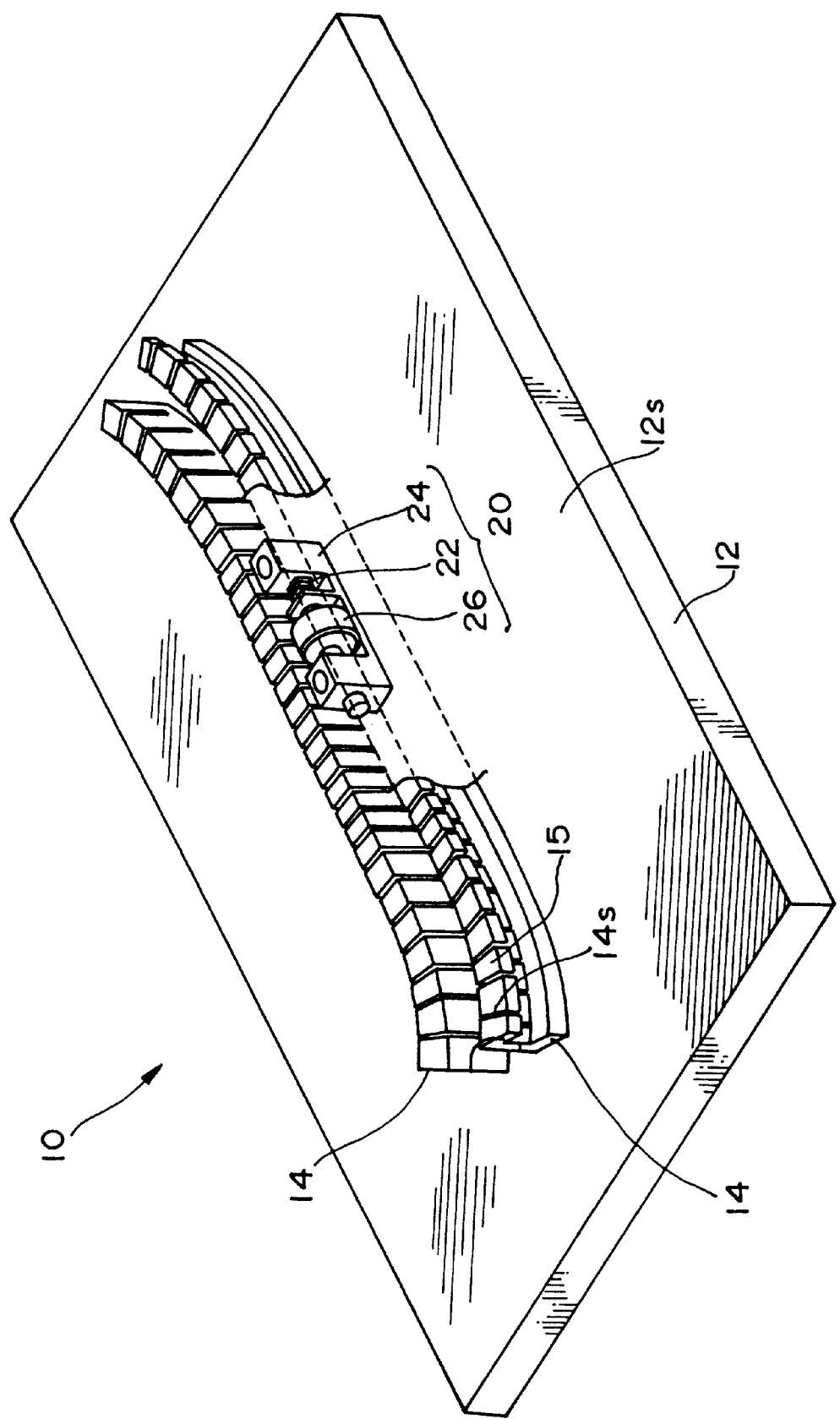
FIG. 2 is a perspective view of an improved drive device.
Figure 4A:
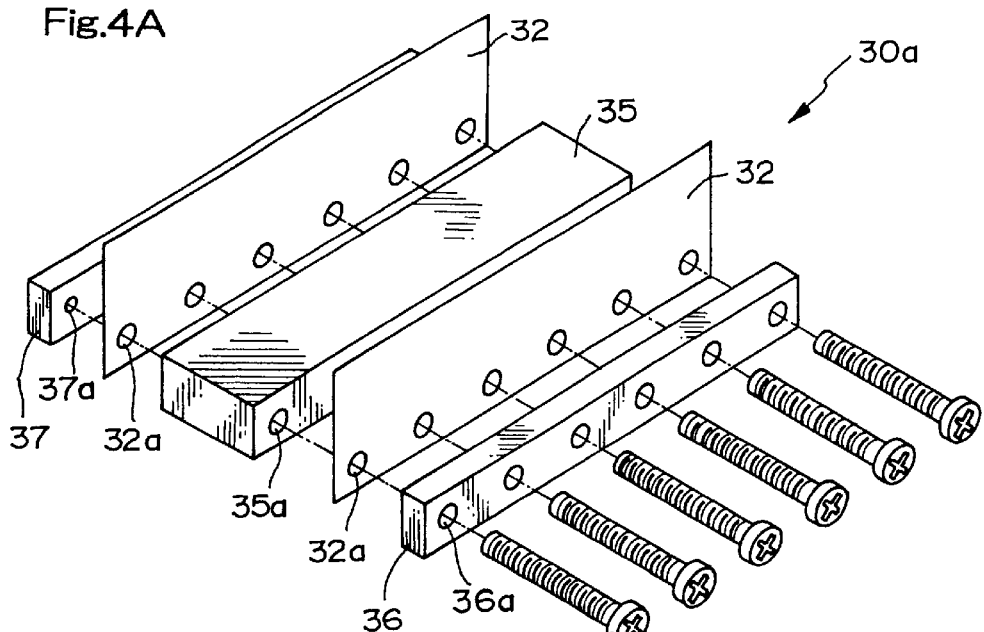
Figure 4B:
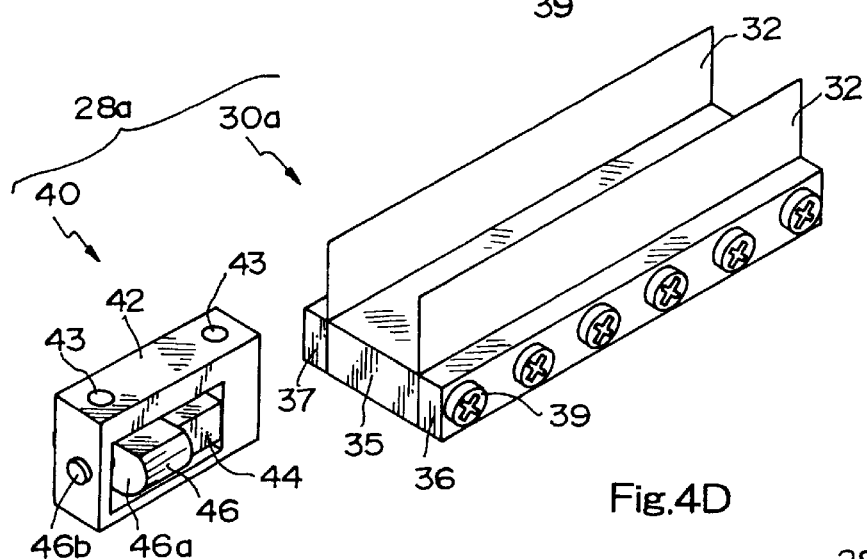
Figure 4C:
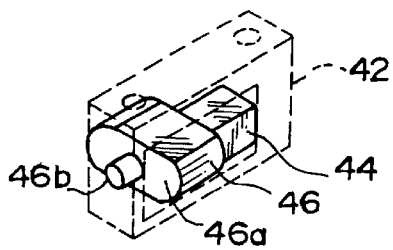
Figure 4D:
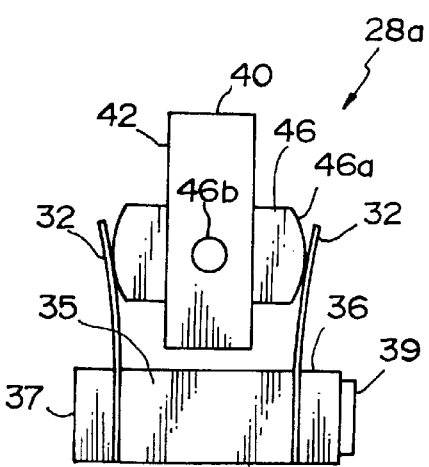

A first embodiment of the present invention will first be explained.

The drive device 28 roughly comprises a grasping unit 30 and a drive unit 40, as shown in the perspective views of FIGS. 3A through 3D, showing the components before and after assembly. The drive unit 40 is placed between two spring plates 32 of the grasping unit 30 such that the main unit 46a of the drive friction member 46 of the drive unit 40 may slide against the spring plates 32.

The grasping unit 30 comprises a spacer 34, spring plates 32 and mounting screws 38. The spacer 34 has a rectangular parallelepiped configuration, and its side surfaces, which are parallel to each other, have screw holes 34a so that the spring plates 32 may be fixed on them to be parallel to each other using mounting screws 38. Each spring plate 32 has holes 32a in which mounting screws 38 are inserted.

The drive unit 40 has a moving unit 42, a piezoelectric element 44 and a drive friction member 46. The moving unit 42 is made of a highly rigid material (such as stainless steel), and has on its top surface screw holes 43 to mount it to the object to be driven. Inside the moving unit 42 are sequentially aligned the piezoelectric element 44 and the drive friction member 46 such that the direction of expansion or contraction of the piezoelectric element 44 matches the axis of the drive friction member 46. The piezoelectric element 44 is formed by stacking pieces of a material that expands or contracts when a voltage is applied to it. One end of the length of the piezoelectric element 44, along which length expansion or contraction occurs, is fixed to the moving unit 42. The drive friction member 46 has shafts 46b on either end of the essentially cylindrical main unit 46a, and one shaft 46b is fixed to the other end of the length of the piezoelectric element 44. The pair of shafts 46b are supported by the moving unit 42 such that they can freely move along their axes, and the drive friction member 46 moves back and forth along its axis as the piezoelectric element 44 expands or contracts.

The distance between the side surfaces of the spacer 34 is specified to be smaller than the width of the main unit 46a of the drive friction member 46 by a prescribed amount, such that friction occurs between the main unit 46a of the drive friction member 46 and the spring plates 32 due to the warping of the spring plates 32, as shown in FIG. 3D. The material, number and thickness of the spring plates 32 should be determined in accordance with the required level of friction and the elastic limit of the spring plates 32. The warping of the spring plates 32 is shown in a magnified fashion in the drawing.

The drive unit 40 is supported such that it can move between and along the spring plates 32 of the grasping unit 30, as explained below with reference to FIGS. 7A through 7D. Pulse voltages having appropriate waveforms are applied to the piezoelectric element 44 in the same fashion as in the conventional sample to cause the element to expand and contract at different rates so that the drive unit 40 moves along the grasping unit 30.

The degree to which the spring plates 32 enter the movement path is determined in accordance with the distance between the side surfaces of the spacer 34. Because the spring plates 32 extend along the movement path and the degree to which they enter the movement path is determined in accordance with the distance between the side surfaces of the spacer 34, the level of friction may be kept constant throughout the movement path by keeping the distance between side surfaces of the spacer 34 constant. The spacer 34 may be accurately formed using a simple configuration such that the distance between the side surfaces is constant.

Further, the spring constant of the spring plates 32 may be easily adjusted by changing the number or thickness of the spring plates used. In addition, in the event any of the spring plates 32 needs to be replaced due to wear, etc., replacement can be carried out easily and with good reproducibility.

Therefore, using a simple construction, the fluctuation in friction between the fixed friction members and the drive friction member may be reduced such that it is kept constant.

The spring constant of each spring plate 32 is determined in accordance with the material and thickness of the spring plate. Spring plates having little variation in thickness may easily be obtained. The spring plates 32 continuously extend along the movement path without any slits. For each spring plate 32, a surface having a uniform roughness may be easily obtained, and it is easy for it to have a constant coefficient of friction throughout its entire surface. Therefore, it is easy to maintain the spring constant of each spring plate 32 throughout the movement path.

Strictly speaking, the spring constant changes near the ends of the spring plates 32. Consequently, it is preferred that the drive range be specified such that the drive friction member 46 is in contact with the spring plates 32 using areas other than the ends.

FIGS. 4A through 4D show a second embodiment. This drive device 28a has essentially the same construction as the drive device 28 comprising the first embodiment, and the same numbers are used for the same components. The main differences are explained below.

The grasping unit 30a of this drive device 28a has pierced holes 35a in the spacer 35. A spring plate 32 is placed on each side of the spacer 35, and the spacer 35 and the pair of spring plates 32 are grasped between a pressing plate 36 and screw plate 37 that are connected by means of mounting screws 39. The lower part of each spring plate 32 is grasped between the spacer 35 and either the pressing plate 36 or the screw plate 37, such that they are uniformly pressed and bound. Consequently, in comparison with the situation where the spring plates 32 are directly fixed by means of mounting screws 38 as in the first embodiment, more uniform deformation of the spring plates 32 may be obtained here. Therefore, when the drive unit 40 moves, the fluctuation in the friction between the drive friction member 46 and the spring plates 32 is further reduced, such that the drive unit 40 may be moved using a more stable speed and thrust.

Figure 5A:
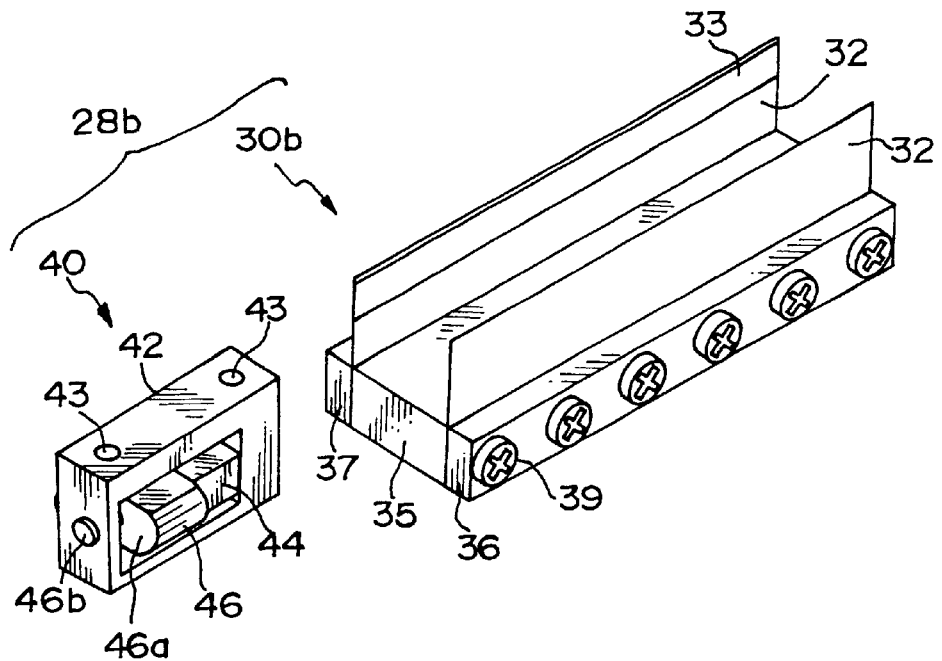
Figure 5B:
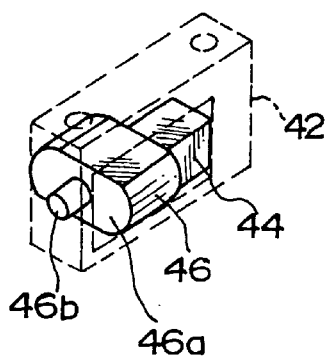
Figure 5C:
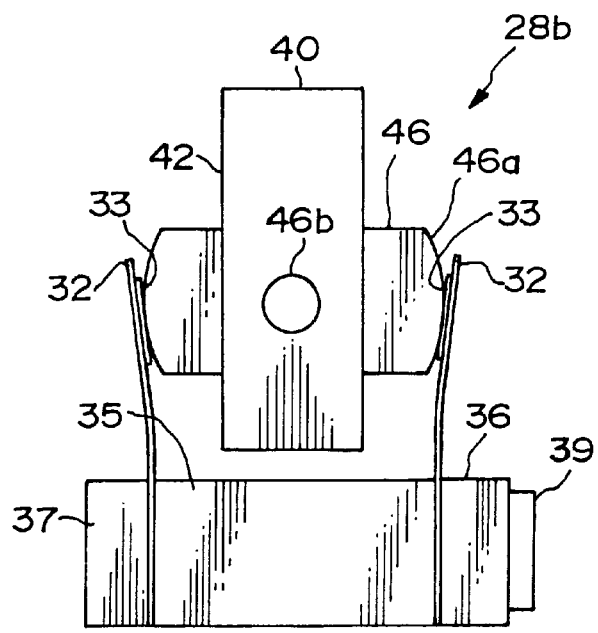
Figure 6A:
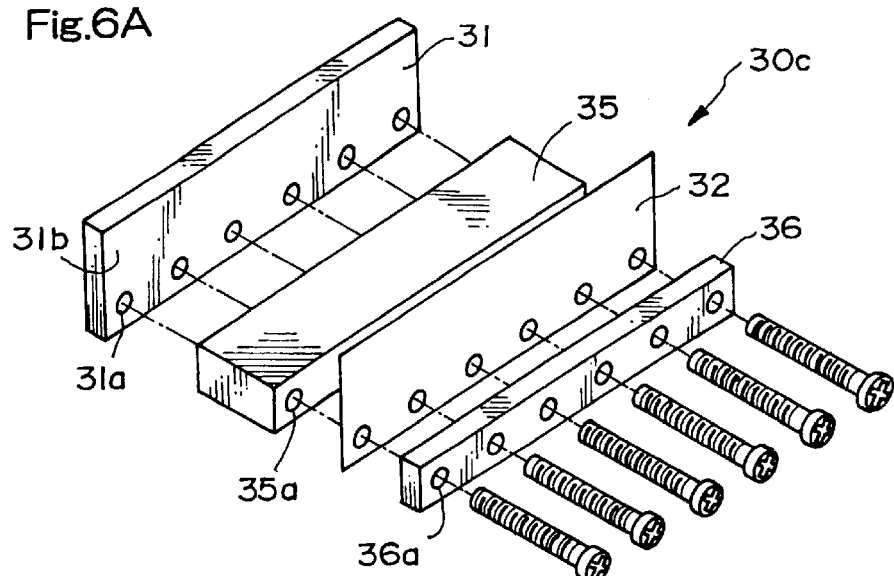
Figure 6B:
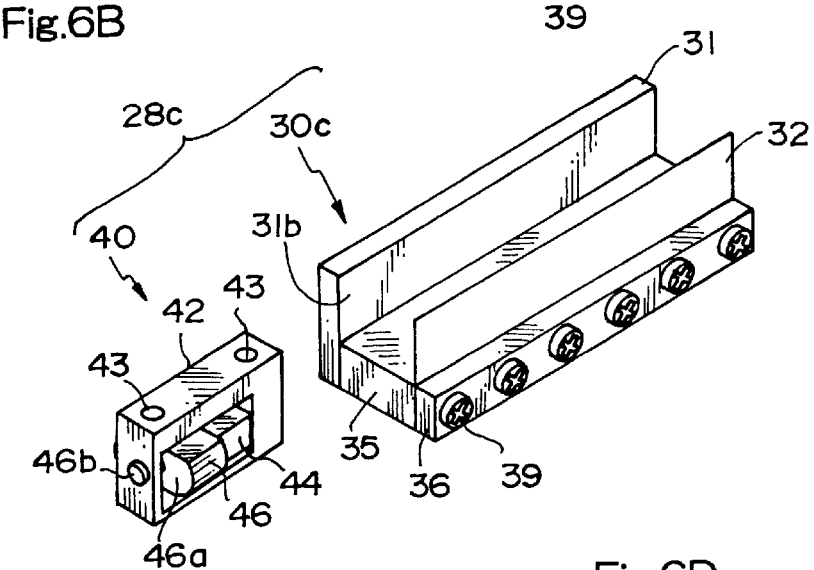
Figure 6C:
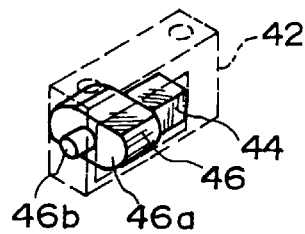
Figure 6D:
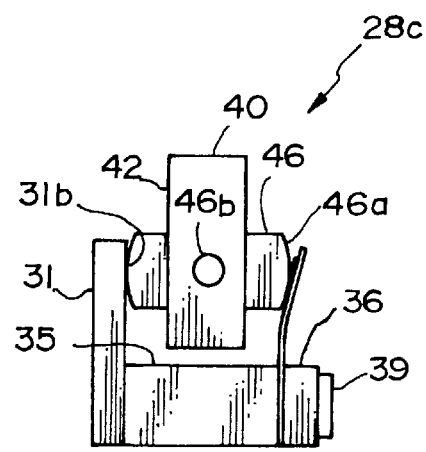
Figure 7A:
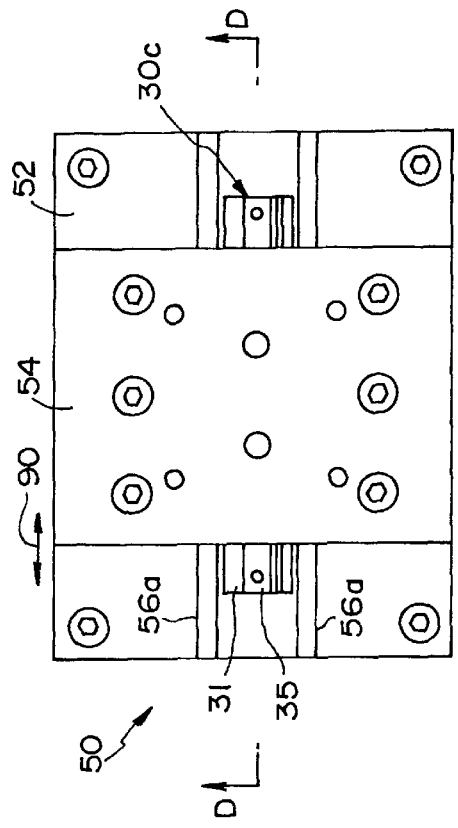
Figure 7C:
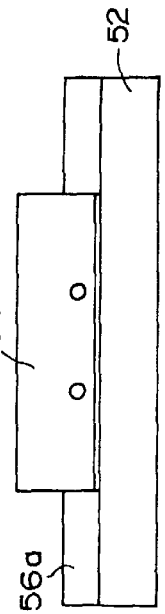
Figure 7B:
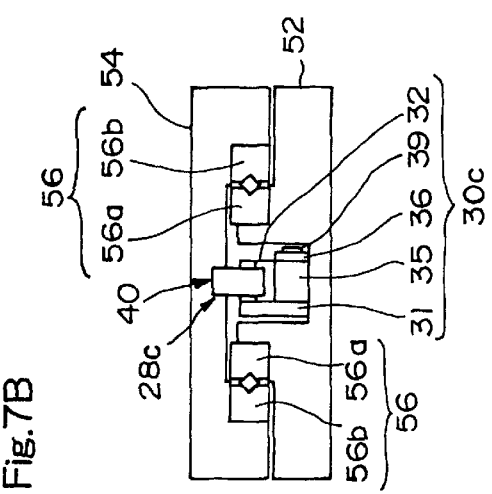
Figure 7D:
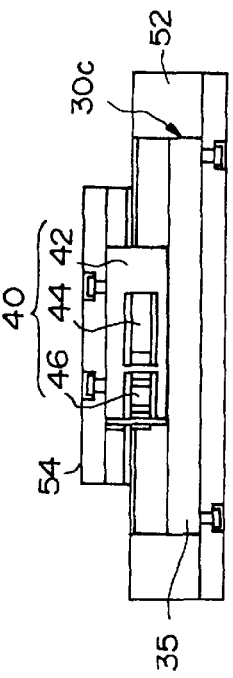

FIGS. 5A through 5C show a third embodiment. While this drive device 28b has essentially the same construction as the second embodiment, it is different in that friction slide members 33 are fixed to the areas of the spring plates 32 that come into contact with the moving unit 42 of the drive unit 40. When forming the spring plates 32, any appropriate material may be selected without concern for the material's coefficient of friction or any countermeasure against wear that may be caused due to contact with the drive friction member 46. A material that has a durability superior to that of the material used for the spring plates 32 in terms of friction with the drive friction member 46 should be used for the friction slide members 33 (a friction-resistant material, for example). It is therefore possible to stabilize the coefficient of friction and maintain stable drive characteristics over a long period of time.

FIGS. 6A through 6D show a fourth embodiment. In this drive device 28c, a rigid guide block 31 is fixed to one side surface of the spacer 35, and a spring plate 32 is fixed to the other side, such that the drive friction member 46 of the drive unit 40 is grasped between the guide block 31 and the spring plate 32. The guide block 31 has screw holes 31a such that the spacer 35, spring plate 32 and pressing plate 36 may be connected by means of mounting screws 39.

Because the moving unit 42 is pushed by the spring plate 32 toward the side surface 31b of the guide block 31, the drive unit 40 moves along the side surface 31b of the guide block 31. Consequently, in this drive device 28c, the drive unit 40 does not deviate from its movement path.

FIGS. 7A through 7D shows an example in which one of the drive devices 28a–28c is used for the driving of a stage 50. As an example, the driving device 28c shown in FIGS. 6A–6D is illustrated in the figures. Needless to say, the driving devices 28a–28b may be used in place of the driving device 28c.

In the stage 50, a base 52 and a moving portion 54 are connected via a pair of straight movement guide rails 56 so that the moving portion 54 may freely move in either direction relative to the base 52, as shown by the two-headed arrow 90. The grasping unit 30c of the drive device 28c is fixed on the top surface of the base 52 such that it is aligned along the guide rails 56 and between the fixed-side mounting brackets 56a of the guide rails 56. The drive unit 40 of the drive device 28c is fixed to the bottom surface of the moving portion 54 such that it is aligned between the moving-side mounting brackets 56b of the guide rails 56, and the drive friction member 46 is grasped between the guide block 31 of the grasping unit 30c and the spring plate 32.

In the stage 50, the moving portion 54, to which the drive unit 40 is connected, moves relative to the base 52, to which the grasping unit 30 is connected, based on the driving by the drive device 28c.

Incidentally, this stage 50 uses the friction that occurs when the drive friction member 46 is grasped between the guide block 31 and the spring plate 32. Therefore, where thrust operates in the direction of movement of the moving unit, as shown in the schematic drawing of FIG. 8A, for example, so long as the thrust does not exceed the frictional force, the moving speed of the moving unit changes due to the thrust, as shown in the schematic drawing of FIG. 8B. In other words, as shown by the solid line in FIG. 8B, when the thrust operates in the direction opposite from the direction of movement of the moving unit, the speed is reduced. On the other hand, if the thrust operates in the direction of movement of the moving unit, the speed increases.

Figure 8B:
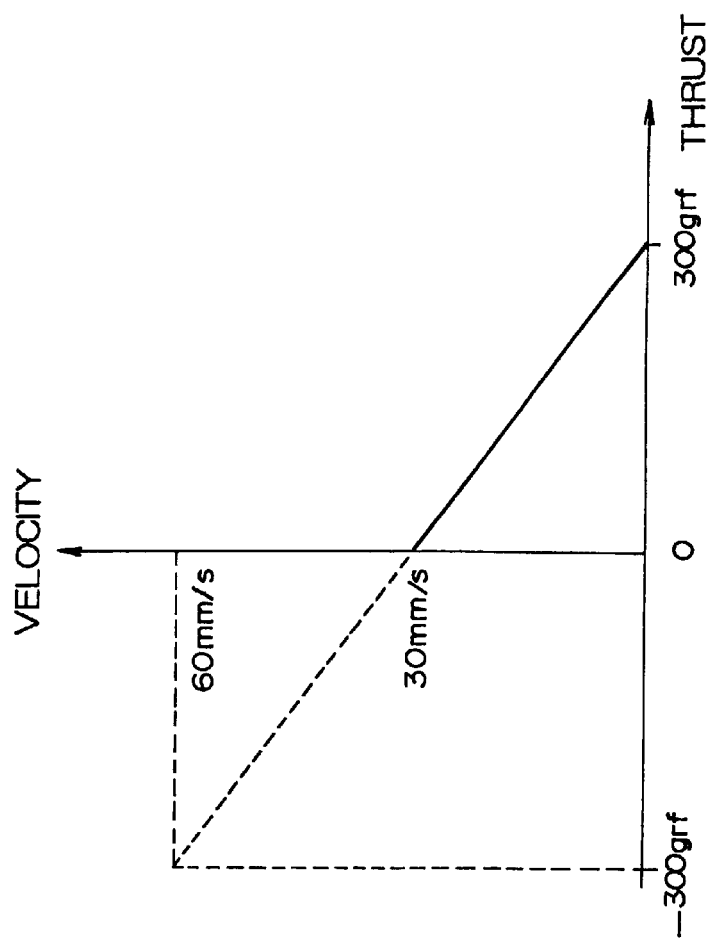
Figure 8A:
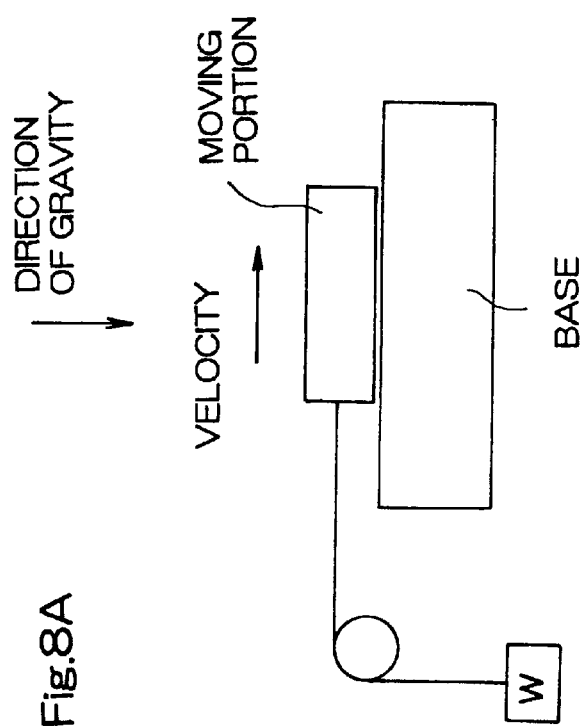
Figure 9B:
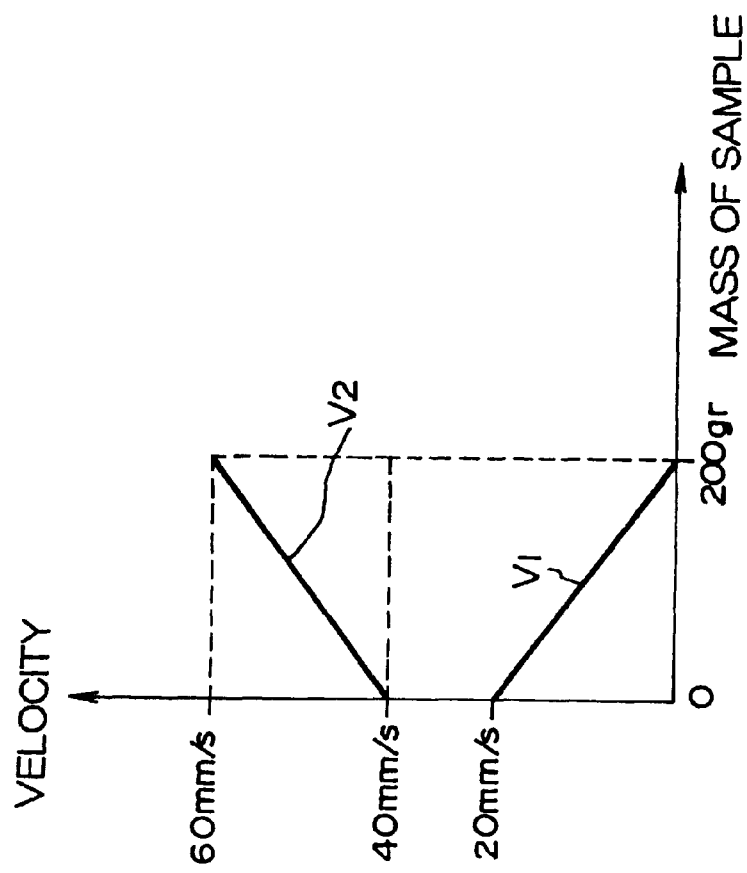
Figure 9A:
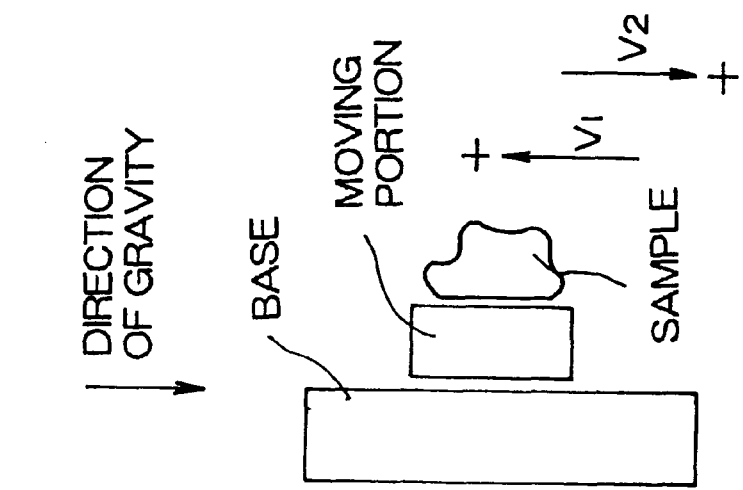

When a stage having the characteristic shown in FIG. 8B is used in an upright position, as shown in FIG. 9A, if the moving portion has a mass of 100 grams, for example, the total weight of the sample and the moving portion operates as the thrust on the drive device. Therefore, the mass of the sample mounted to the moving portion has the relationship shown in FIG. 9B with the speed V1 (upward) or the speed V2 (downward). Consequently, the range of thrust that can drive the moving portion results in ±200 grams, which is substantially smaller than the ±300 grams that is available when the stage is placed flat.

Figure 10A:
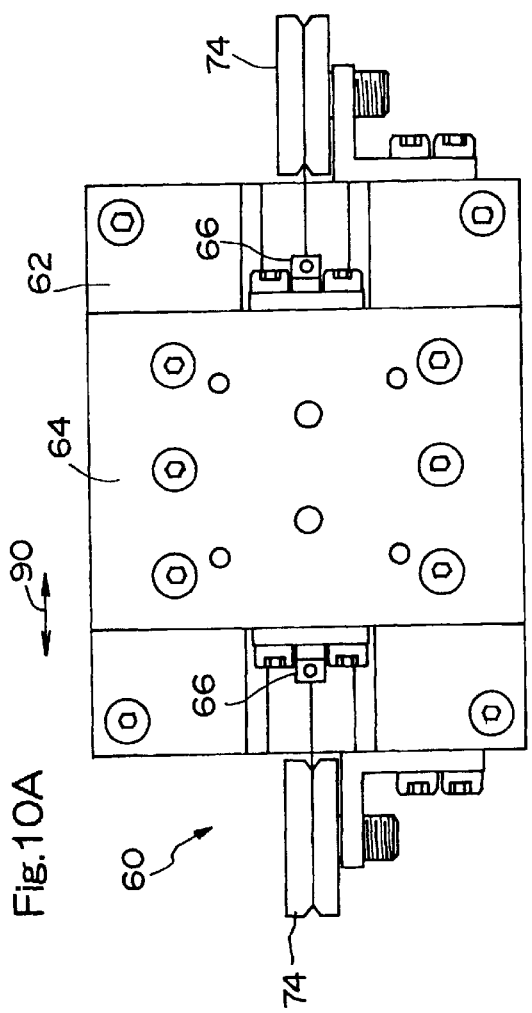
Figure 10C:
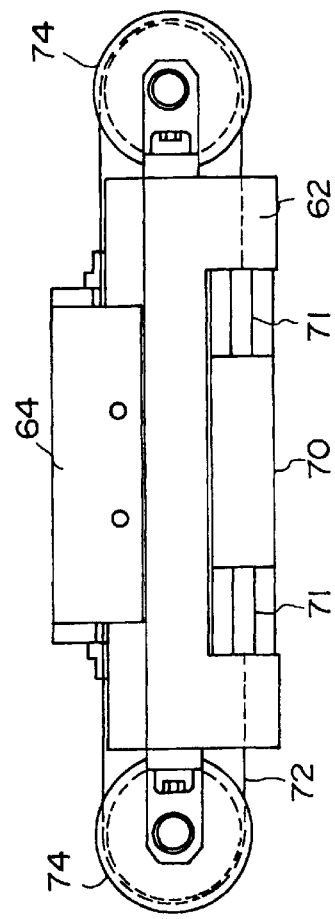
Figure 10B:
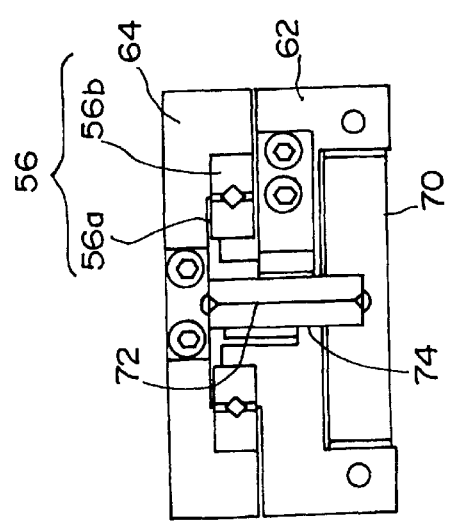

A modified stage 60 is shown in FIGS. 10A through 10C. The stage 60 has essentially the same construction as the stage 50 shown in FIGS. 7A through 7D, and the moving portion 64 moves by means of the drive device 28c in either direction indicated by the two-headed arrow 90 relative to the base 62. It is different in that a balance weight 70 is mounted to the bottom of the base 62.

To explain in more detail, a balance weight 70 is supported at the bottom of the base 62 by slide guides 71 such that it can freely move in the direction parallel to that of the moving portion 64. Pulleys 74 are fixed to either end of the base 62, such that the wire attachment members 66 of the moving portion 64 and the balance weight 70 are connected by wire 72. Consequently, the moving portion 64 and the balance weight 70 move in opposite directions. The balance weight 70 has the same mass as the moving portion 64. The balance weight 70 has an additional weight mounting member (not shown in the drawing) so that the mass may be increased if desired.

Figure 11A:
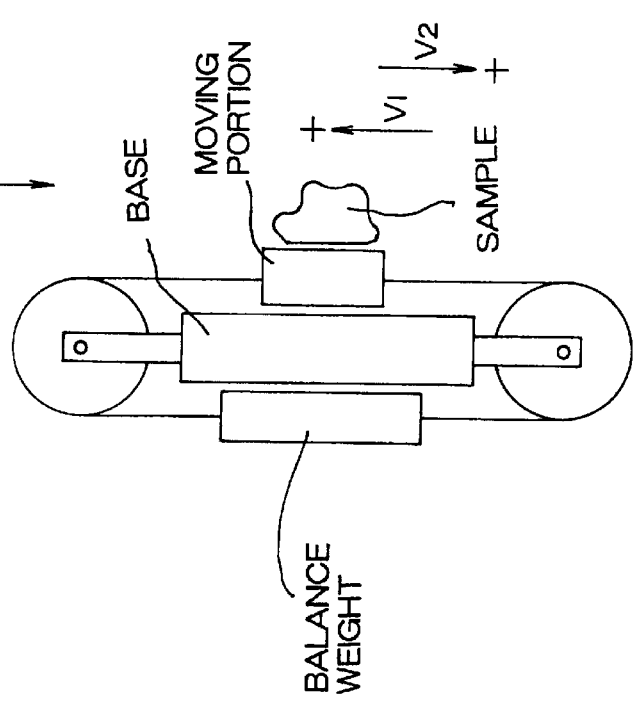
Figure 11B:
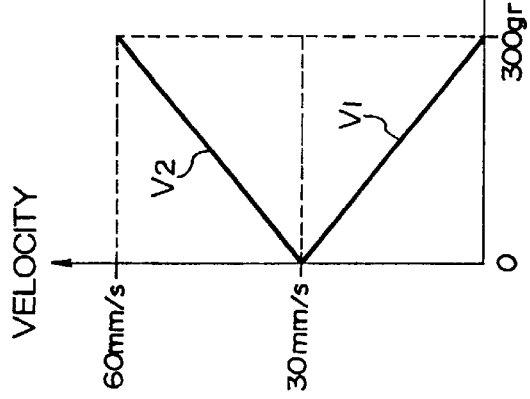

This stage 60 is used in an upright position, as shown in the schematic drawing of FIG. 11A. The base is fixed to a device not shown in the drawing.

Where the mass of the moving portion equals that of the balance weight, no thrust operates on the drive device when there are no samples on the moving portion. For example, where a balance weight is mounted in the stage having the characteristic shown in FIG. 8B, and the moving portion and the balance weight each have a mass of 100 grams, the weight of the sample placed on the moving portion has the relationship shown in FIG. 11B with the moving speed when the stage is in an upright position. In this position, the maximum weight of the sample that can be moved upward or downward is 300 grams.

Figure 11C:
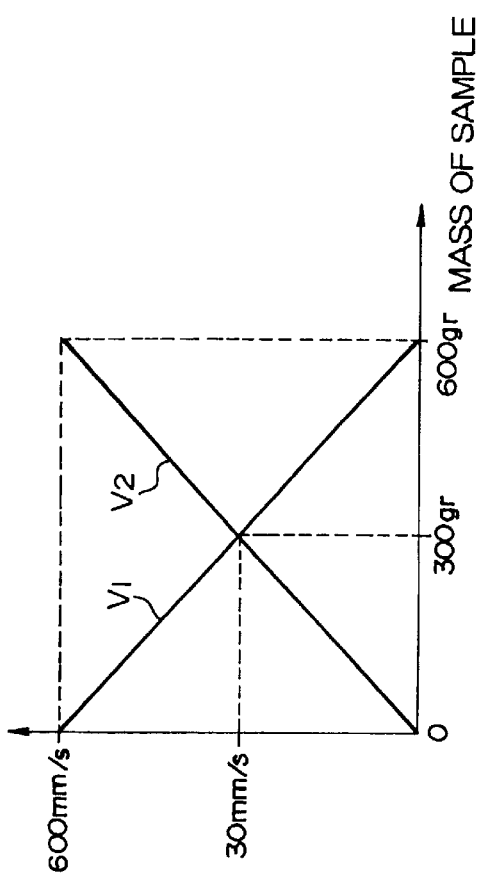

When a 300-gram additional weight is mounted to the balance weight in this position, a 300-gram thrust operates upward on the drive device. The weight of the sample may be increased until the thrust that operates on the drive device reaches 300 grams downward. In this case, the relationship between the sample weight and the moving speed is as shown in FIG. 11C. In other words, the range of sample weight that may be moved upward or downward may be increased to 600 grams.

In each drive device explained above, using a simple construction, the fluctuation in friction between the fixed friction members and the drive friction member may be reduced such that it is kept constant.

In each embodiment, if the side surfaces of the spacer comprise curved surfaces, the movement path may be curved.

In each embodiment explained above, the level of friction between the drive friction member and the plate members (i.e. the spring plates and the rigid guide block) is determined in accordance with the degree to which the plate members enter the movement path, the spring constant of the plate member, and the coefficient of friction of the contact surface of the plate member.

The degree to which the plate members enter the movement path is determined in accordance with the distance between the side surfaces of the spacer. Because the plate members extend along the movement path and the degree to which they enter the movement path is determined in accordance with the distance between the side surfaces of the spacer, the level of friction may be kept constant throughout the movement path by keeping the distance between the side surfaces of the spacer constant. The spacer may be accurately made using a simple configuration such that the distance between the side surfaces is easily kept constant.

The spring constant of each plate member, i.e. spring plate, is determined in accordance with the material and thickness of the plate member. Spring plates having little variation in thickness may easily be obtained. In addition, because the plate member continuously extends along the movement path without any slits, it offers an essentially constant spring constant regardless of the location at which the drive friction member is in contact with it. Therefore, it is easy to keep the spring constant of the plate member constant.

For the plate member, a surface having a uniform roughness may be easily obtained and it is easy for it to have a constant coefficient of friction throughout its entire surface. Therefore, it is easy to keep the spring constant of the plate member constant throughout the movement path.

Further, the spring constant of the plate member may be easily adjusted by changing the number or thickness of the plate members used. In addition, where any of the plate members needs to be replaced due to wear, etc., replacement can be made easily and with good reproducibility.

Therefore, using a simple construction, the fluctuation in friction between the fixed friction members (i.e. the spring plates and the rigid guide block) and the drive friction member may be reduced such that it is kept constant.

In the second embodiment explained above, the drive device has pressing members (pressing plates) whose surfaces face the side surfaces of the spacer. The fixed friction member, which comprises a plate member having a spring capability (spring plate), is grasped between the pressing member and the side surface of the spacer.

Using this construction, the plate member is grasped between the pressing member and the spacer so that the mounting area is uniformly bound along the movement path, which results in reduced fluctuation in the spring constant of the plate member along the movement path. Therefore, the fluctuation in the driving speed based on the location of the drive unit in the movement path may be reduced, and stable driving at a constant speed and thrust becomes possible.

In the third embodiment explained above, a friction slide member is fixed to an area of at least one of the plate members that has a spring capability (spring plates), said area coming into contact with the drive friction member.

In this construction, the term 'fixed' refers not only to the situations in which the pre-formed friction slide member is fixed by means of an adhesive, welding, fusion welding, pressure welding or wax, but also to situations in which the friction slide member is formed at the same time as it is fixed to the plate member. For example, the friction slide member may comprise baked enamel or ceramic coating by means of spraying or deposit, or plastic lining formed by means of liquid application, powder baking or sheet lining.

Using this construction, while a friction slide member is used which is more appropriate for sliding in terms of coefficient of friction and resistance to wear, a more appropriate material, thickness and number may be selected for the plate member without concern for the sliding requirements. Therefore, the drive device may be easily improved in terms of performance and reliability.

In general, when the frictional connection between the drive friction member and the fixed friction members (the plate members, i.e. the spring plates and the rigid guide block) is used, the driving speed changes if thrust operates along the direction of driving. Therefore, when driving is performed in the direction of gravity, since the weight of the drive friction member, piezoelectric member and moving unit operates as the thrust, limitations that were not a consideration in the case of horizontal driving occur with regard to the weight range and driving speed of the object to be driven.

In the improved stage described above, the drive device has an electromechanical conversion element that is connected to a drive pulse generator and expands or contracts, a moving unit that is connected to one end of the length of the electromechanical conversion element, along which length expansion or contraction occurs, a drive friction member that is fixed to the other end of the length of the electromechanical conversion member, and two elongated fixed friction members (i.e. the spring plate and the rigid guide block) that extend and are fixed along the movement path of the drive friction member and that grasp the drive friction member via friction, wherein the electromechanical conversion element is caused to expand or contract by means of a drive pulse generator to drive the drive friction member and to move the moving unit in a prescribed direction. The drive device has a balance weight that gives the moving unit a second force that operates in the opposite direction from the direction of the first force that operates on the moving unit in the direction of its movement.

Using this construction, the thrust that operates on the moving unit is determined in accordance with the first and second forces that work in opposite directions. Here, because the second force may be changed using the balance weight, the thrust that operates on the moving unit may be appropriately adjusted.

Therefore, the weight range and driving speed of the object to be driven may be increased by adjusting the mass of the balance weight.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A drive device comprising:
   an electromechanical converter which expands and contracts by receiving a pulse from a drive pulse generator;

a drive friction member which is connected to said electromechanical converter for moving along the expansion and contraction direction of said electromechanical converter;

two elongated fixed friction members, at least one of which includes a plate member having a spring capability, and which extend for forming a movement path along which said drive friction member is to be moved and which grasp said drive friction member in between them by means of friction; and a spacer which has side surfaces that are distanced from each other over a distance slightly smaller than the width of said drive friction member and which extend along the movement path;

wherein, each fixed friction member is mounted to a respective side surface of said spacer so that friction is provided between the fixed friction members and the drive friction member.

2. A drive device according to claim 1, further comprising a pressing member which grasps one of said fixed friction members between said pressing member and the one of said side surfaces of said spacer.

3. A drive device according to claim 1, further comprising a friction slide member which is fixed to said fixed friction member, and wherein said friction slide member is in sliding contact with said drive friction member.

4. A drive device according to claim 1, further comprising:

a moving unit which comprises said drive friction member and said electromechanical converter for moving along the movement path; and a balance weight for providing said moving unit a force that operates in an opposite direction from the direction of a force that operates on said moving unit along the direction of its movement.

5. A drive device according to claim 1, wherein one of said fixed friction members is made of a plate member having a spring capability, and another of said fixed friction members is a rigid guide member.

6. An apparatus comprising:

a drive pulse generator which generates pulse signals;

an electromechanical converter which is electrically connected to said drive pulse generator, and which expands and contracts by means of the pulse signals;

a drive friction member which is connected to said electromechanical converter for moving along the expansion and contraction direction of said electromechanical converter;

two elongated fixed friction members, which extend for forming a movement path along which said drive friction member is to be moved and which grasp said drive friction member in between them by means of friction, at least one of said fixed friction members including a plate member having a spring capability; and a spacer which has side surfaces that are distanced from each other over a distance slightly smaller than the width of said drive friction member and which extend along the movement path;

wherein, each fixed friction members is mounted to a respective side surface of said spacer so that friction is provided between the fixed friction members and the drive friction member.

7. An apparatus according to claim 6, further comprising a pressing member which grasps one of said fixed friction members between said pressing member and one of said side surfaces of said spacer.

8. An apparatus according to claim 6, further comprising a friction slide member which is fixed to said fixed friction member, and wherein said friction slide member is in sliding contact with said drive friction member.

9. An apparatus according to claim 6, further comprising:

a moving unit which comprises said drive friction member and said electromechanical converter for moving along the movement path; and a balance weight for providing said moving unit a force that operates in an opposite direction from the direction of a force that operates on said moving unit along the direction of its movement.

10. An apparatus according to claim 9, wherein said apparatus is a stage for moving a sample, said stage having a moving portion for mounting the sample thereon, and wherein said moving unit is fixed to the moving portion.

11. An apparatus according to claim 10, wherein the mass of said balance weight is substantially equal to a sum of the mass of said moving portion and said moving unit.

12. An apparatus according to claim 6, wherein one of said fixed friction members is made of a plate member having a spring capability, and another of said fixed friction members is a rigid guide member.

* * * * *

UNITED STATES PATENT AND TRADEMARK OFFICE
CERTIFICATE OF CORRECTION

PATENT NO. : 6,384,493 B1
DATED : May 7, 2002
INVENTOR(S) : Yasuhiro Okamoto

It is certified that error appears in the above-identified patent and that said Letters Patent is hereby corrected as shown below:

Drawings,
Sheet 7, delete:

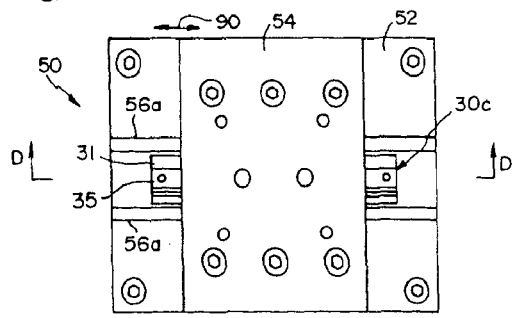

Fig.7A

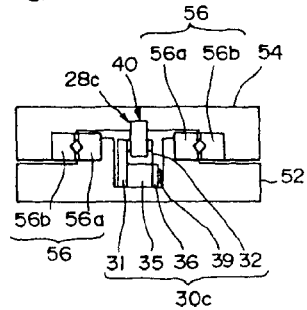

Fig.7B

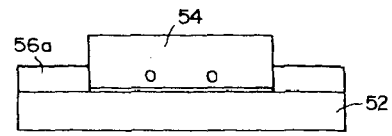

Fig.7C

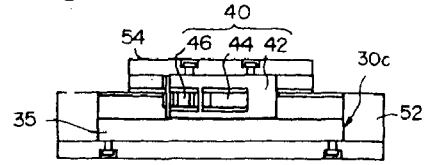

Fig.7D

UNITED STATES PATENT AND TRADEMARK OFFICE
CERTIFICATE OF CORRECTION

PATENT NO. : 6,384,493 B1
DATED : May 7, 2002
INVENTOR(S) : Yasuhiro Okamoto

It is certified that error appears in the above-identified patent and that said Letters Patent is hereby corrected as shown below:

Drawings,
Sheet 7, insert:

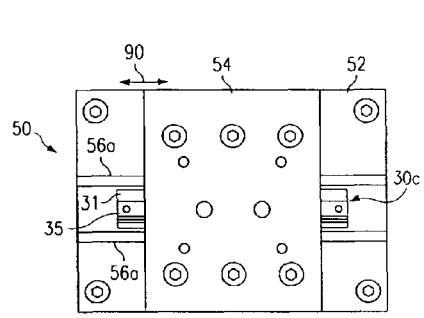

FIG. 7a

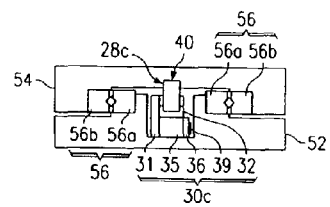

FIG. 7b

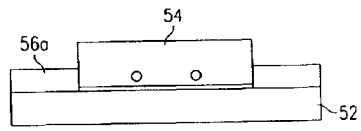

FIG. 7c

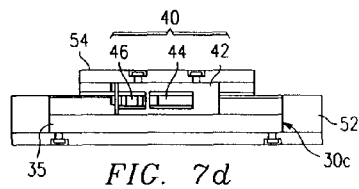

FIG. 7d

UNITED STATES PATENT AND TRADEMARK OFFICE
CERTIFICATE OF CORRECTION

PATENT NO. : 6,384,493 B1
DATED : May 7, 2002
INVENTOR(S) : Yasuhiro Okamoto

It is certified that error appears in the above-identified patent and that said Letters Patent is hereby corrected as shown below:

Column 2,
Line 22, after "change", insert -- , --.

Column 9,
Line 22, after "and", delete "the".

Column 10,
Line 15, delete "members", and insert -- member --.

Signed and Sealed this

Nineteenth Day of November, 2002

*Attest:*

JAMES E. ROGAN
*Attesting Officer*      *Director of the United States Patent and Trademark Office*